Aug. 25, 1959    D. BERLIN    2,901,262
MULTI-TIER LAUNDRY CART
Filed Dec. 10, 1956

INVENTOR.
DANIEL BERLIN
BY
Harry Langsam
ATTORNEY

United States Patent Office 2,901,262
Patented Aug. 25, 1959

2,901,262

MULTI-TIER LAUNDRY CART

Daniel Berlin, Philadelphia, Pa.

Application December 10, 1956, Serial No. 627,401

1 Claim. (Cl. 280—41)

My invention relates to a laundry cart and more particularly relates to a collapsible multi-tier laundry cart commonly used to receive, store, and transport articles or parcels during marketing or laundry activities.

In the present day mode of living, with small apartments or houses in which storage space is at a premium, it has become increasingly necessary to use compact, convertible and collapsible devices, or by one device doing the work of several. Furthermore, when such a device is not in use at all, it is desirable for it to have the capacity to be collapsed or folded into a small, compact unit which will occupy but a small storage space. With the advent of suburban living and widely separated shopping centers, it is the custom for the shopper to bring along a shopping cart which may be conveniently carried in an automobile to the market center. These carts must of necessity be sturdy in construction and of large capacity in order to accommodate the considerable volume of articles which are purchased in various areas within the center and transported therebetween during the shopping tour. In addition, it is desirable for these carts to have baskets which may be separated from the carts and carried from place to place when it is inconvenient or the area is inaccessible to maneuver the cart itself.

While numerous carts of this nature have been previously manufactured, such carts have been found to be wanting because of the complexity of structure which makes manufacture expensive or because of the intricate folding construction presenting problems to the user.

Although it is primarily for shopping and laundry use that the present invention has been designed, the device may just as well be used for many other purposes in its original state, and may be easily converted to serve still further uses when desired.

It is therefore, an object of my invention to provide a sturdy shopping and laundry cart which may be easily collapsed into a small storage space.

Another object of my invention is to construct a collapsible shopping cart whose arrangement of parts is such as to provide for ease of economical manufacture, requiring a minimum of welded components, and which is adapted for large scale production.

Another object of my invention is to provide a collapsible shopping and laundry cart wherein an efficient and simple manner of folding is afforded.

Another object of my invention is to provide a collapsible shopping and laundry cart having detachable baskets which can be accommodated upon one or more tiers.

Another object of my invention is to provide a collapsible shopping and laundry cart which is useful for many purposes in its original state and which may easily be converted to serve additional purposes.

Another object of my invention is to provide a collapsible shopping and laundry cart wherein the construction of the cart is such as to provide protection for lightweight baskets or trays carried therein and prevent damage during transportation.

Other objects of my invention are to provide an improved device of the character described, that is easily and economically produced, which is sturdy in construction, and which is highly effective in operation.

With the above and related objects in view, my invention consists is in the details of construction and combination of parts, as will be more fully understood from the following description, when read in conjunction with the accompanying drawing, in which.

Figure 1:
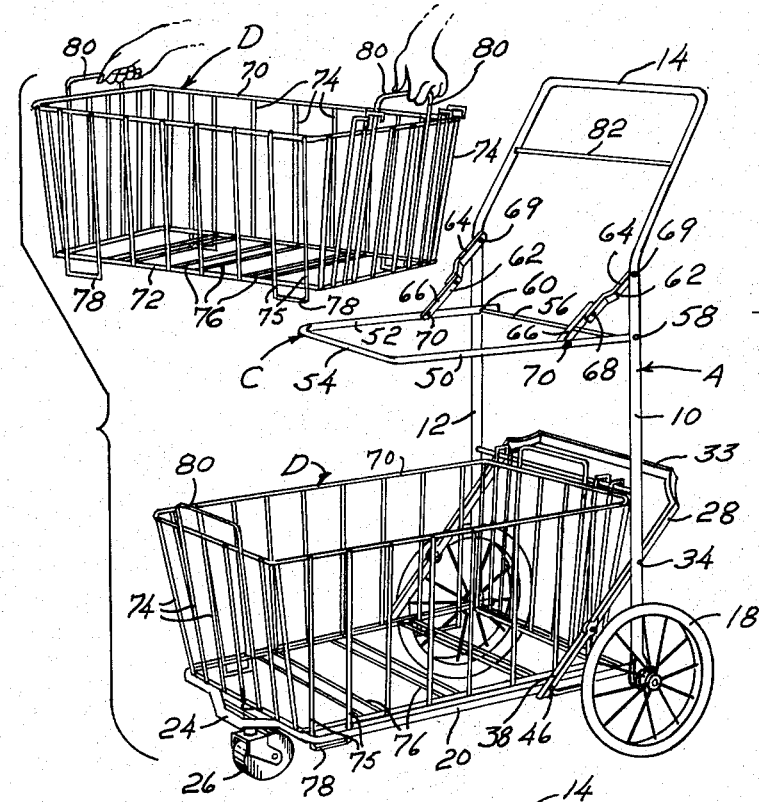
Fig. 1 is a perspective view of a collapsible shopping and laundry cart embodying my invention showing the cart in open position with a basket removed.
Figure 2:
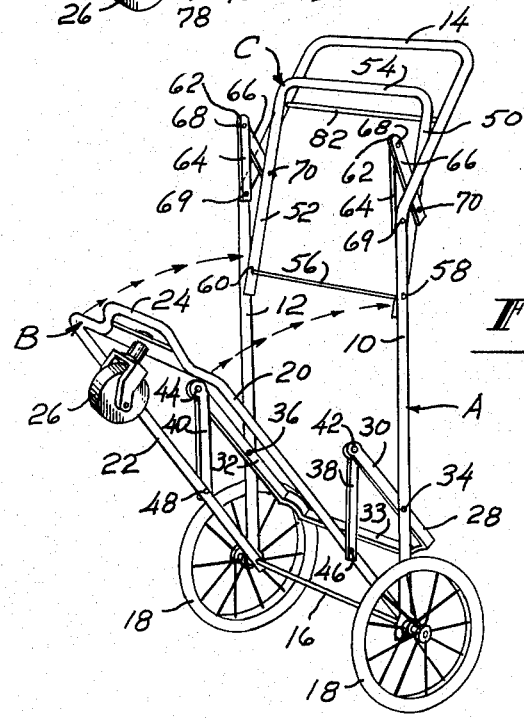
Fig. 2 is a perspective view of the shopping and laundry cart in partial collapsed position.

Referring now in greater detail to the drawing, in which similar reference characters refer to similar parts, I show a multi-tier collapsible shopping and laundry cart comprising a frame, generally designated as A, a lower folding member, generally designated as B, an upper folding member, generally designated as C, and a plurality of baskets, generally designated as D, and adapted to fit upon either the upper or lower folded member.

The frame A, is generally U-shaped in construction and comprises a pair of tubular legs 10 and 12, extending from a closed portion which is used as a handle 14. The upper portion of each of the legs 10 and 12, is folded backwardly to facilitate rolling of the cart about by promoting sufficient leverage as to not upset the cart. The lower portion of each of the legs is apertured to receive an axle 16 which supports a pair of wheels 18 at either end thereof to enable the cart to be rolled about.

The lower folding member B, is also generally U-shaped in construction having a pair of tubular side members 20 and 22 extending from a closed bight portion 24. It is to be observed that the bight portion extends forwardly of the baskets D when inserted therein, thereby acting as a front bumper. The forward portion 24 or bumper has a caster 26 suspended therein in order to permit the cart to stand in vertical, upright position when unfolded and also to assist rolling of the cart about when the support members B and C are loaded. The open end of the tubular side members 20 and 22 have a hole therein through which the axle 16 extends to provide pivotal arrangement thereon. A locking brace 28 limits the forward open position of the lower member B and comprises a U-shaped bracket having arms 30 and 32 extending from a closed bar 33. The intermediate portions of the legs 30 and 32 are respectively pivotally connected to the adjacent legs 10 and 12 of the frame A, at 34 and 36. The forward portion of each of the legs 30 and 32 have a link 38 and 40 pivotally connected at 42 and 44 respectively. The opposite end of each of the links 38 and 40 are pivotally connected at 46 and 48 to a respective side member 20 and 22 of the lower member B.

The upper member C comprises a U-shaped tubular member having a pair of arms 50 and 52, extending from a closed portion 54. The open ends of the arms 50 and 52 have a strut 56 extending therebetween, upon which the upper member is pivotally connected to the frame A at 58 and 60 respectively immediately below the bend in the legs 10 and 12. Hinge members 62 support the upper shelf C in cantilever fashion and each comprises link members 64 and 66, pivotally connected to each other by a swivel rivet 68. The opposite ends of the arm 64 is pivotally connected at 69 adjacent the bend in the legs of the frame A while the other end of the link member 66 is pivotally connected at 70 to the upper U-shaped member C.

The baskets D comprise generally rectangular wire frames 70 and 72, having a plurality of wire side and end wall members 74 and a plurality of wire bottom struts 76. Adjacent each corner the side walls have a pair of struts 75 with a closed end and extending below the bottom to form feet 78. On the end walls, a pair of the wire struts have a closed upper portion 80 to define handles for lifting the basket. It is to be observed that the basket D is designed to interfit within the lower member B, the feet 78 being internal of the member while the end walls are supported at the lowermost portion on the bight 24 and the axle 16 respectively when the cart is in open position. On the upper member C, the basket is supported upon the closed end 54 and upon the strut 56 and is limited in its backward motion by a strap 82 extending across the frame A.

As is apparent from the foregoing description, my collapsible cart operates as follows: The lower member is collapsed by kicking the foot downwardly against the closed end 33 of the brace 28. This frees the locked position of the lower member B and pulling upwardly upon the bumper 24 the member B is collapsed flat against the frame A. Correspondingly, the upper member C is folded within the upper bent portion of the frame by pushing upwardly on the support hinge members and collapsing the U-shaped member within the frame A against the strap 82. It is to be observed that the baskets D may be carried upon either or both of the supporting members B and C when they are in extended position and parallel to the floor. The baskets may be also removed from their carriage position within the cart by lifting upwardly on the handles 80 and carry them to any flat surface and resting them upon their feet 78.

Although my invention has been described in considerable detail, such description is intended as being illustrative rather than limiting, since the invention may be variously embodied, and the scope of the invention is to be determined as claimed.

I claim:

A multi-tier collapsible shopping cart comprising a single, inverted, U-shaped frame, an axle passing through the ends of said frame and having supporting wheels thereon, a U-shaped basket support member pivotally connected at the ends thereof to said axle, a ground engaging front wheel pivotally connected between the sides of said U-shaped frame and spaced from the front end of said support member, an extension integrally formed on said basket support member to guard said wheel and to serve as a bumper for said wheel, and a U-shaped locking brace partially extending to each side of said inverted U-shape frame and having a pair of links pivotally connected at one end to said basket support member and the other end of said links being connected to the free end of said locking brace whereby said basket support may be elevated by pressing on said locking brace.

References Cited in the file of this patent

UNITED STATES PATENTS

| | | |
|---|---|---|
| 2,141,881 | Schray | Dec. 27, 1938 |
| 2,196,914 | Goldman | Apr. 9, 1940 |
| 2,212,053 | Smith | Aug. 20, 1940 |
| 2,429,034 | Smith | Oct. 14, 1947 |
| 2,678,219 | Goodman | May 11, 1954 |
| 2,727,750 | Noll | Dec. 20, 1955 |

FOREIGN PATENTS

| | | |
|---|---|---|
| 232,739 | Great Britain | Apr. 30, 1925 |
| 639,439 | Great Britain | June 28, 1950 |